Nov. 13, 1945.   W. H. THOMPSON   2,388,773
EVAPORATOR
Filed June 13, 1942   3 Sheets-Sheet 1

INVENTOR
WILLIAM H. THOMPSON
BY
George T. Gill
ATTORNEY

Nov. 13, 1945.  W. H. THOMPSON  2,388,773
EVAPORATOR
Filed June 13, 1942  3 Sheets-Sheet 3

INVENTOR
WILLIAM H. THOMPSON
BY
George T. Gill
ATTORNEY

Patented Nov. 13, 1945

2,388,773

UNITED STATES PATENT OFFICE 2,388,773

EVAPORATOR

William H. Thompson, Chatham, N. J., assignor to Davis Engineering Corporation, Elizabeth, N. J., a corporation of Delaware Application June 13, 1942, Serial No. 446,955

8 Claims. (Cl. 202—174)

The invention herein disclosed relates to the evaporation of liquids and more particularly to an evaporator especially suitable for use in a system in which there is a continuous blow down. The invention also comprehends a system of like evaporators arranged for multiple effect evaporation.

In the copending application Serial No. 432,612, filed February 27, 1942, by Howard C. Davis and William H. Thompson as joint inventors, there is disclosed a distillation system that is particularly suitable for providing a continuous supply of pure distilled water irrespective of the nature of the source. The system is arranged so that there is a continuous blow down of the evaporator or evaporators which prevents the accumulation or concentration of solid matter, thereby greatly increasing the duration of operation before affecting the capacity output. To this end the evaporator of a single effect plant and the evaporators of a multiple effect plant are continuously supplied with water, and continuously blown down.

The invention herein disclosed provides an arrangement for evaporators that permit of a continuous supply to and blow down from an evaporator without the danger of flooding the evaporator; that avoids ebullition in the blow down; and that allows of a change in working pressure within the evaporator without disturbing the evaporation. In accordance with the invention, the outlet for the blow down from the evaporator comprises communicating passages arranged to effect a pressure relation such that there may be a free flow from the bottom of the evaporator without the danger of emptying or flooding the evaporator. When arranged in a multiple effect plant, each evaporator may be blown down into the next succeeding evaporator through the arrangement of passages even though the several evaporators may be operating at different pressures.

Figure 1:
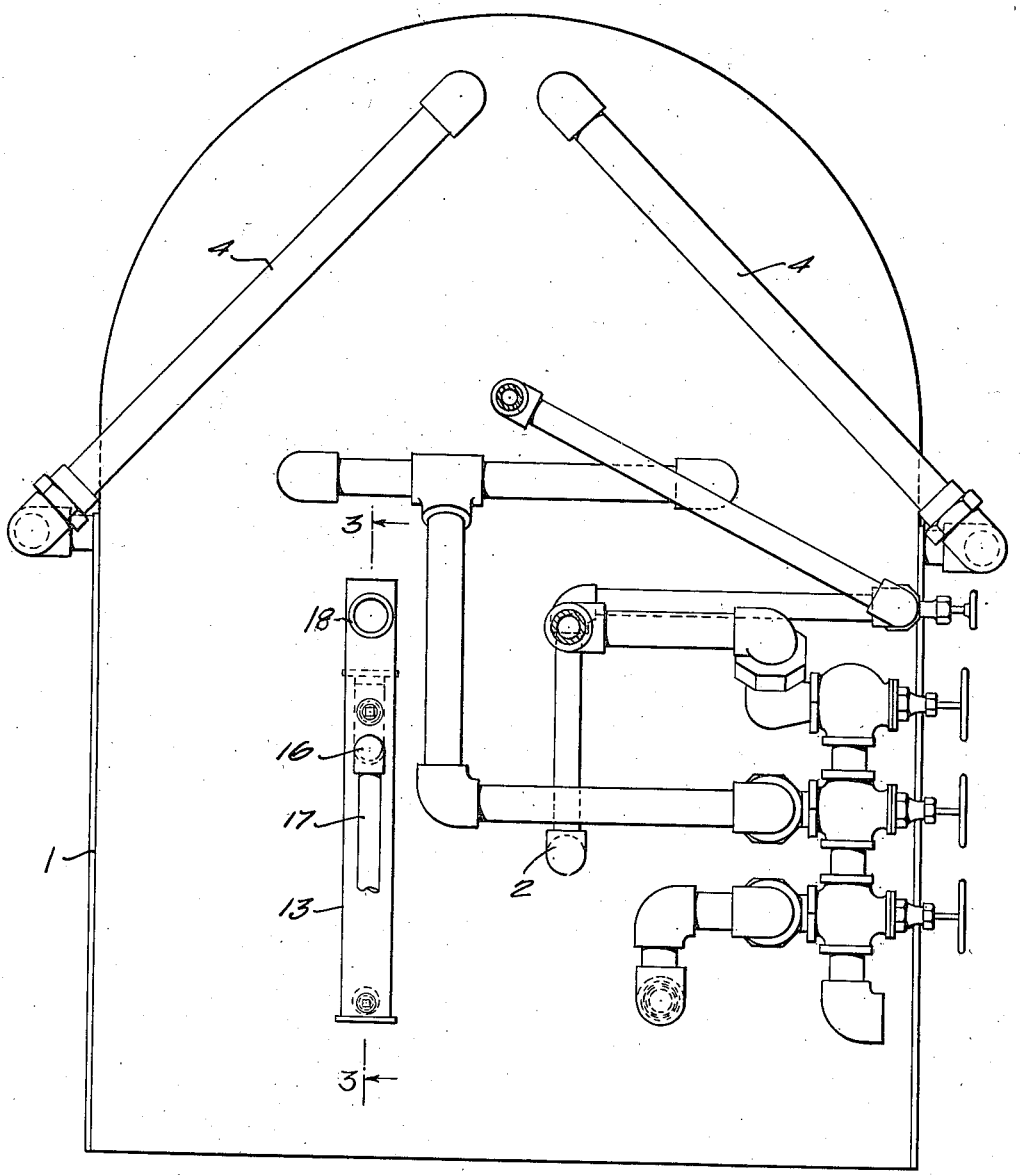
Figure 2:
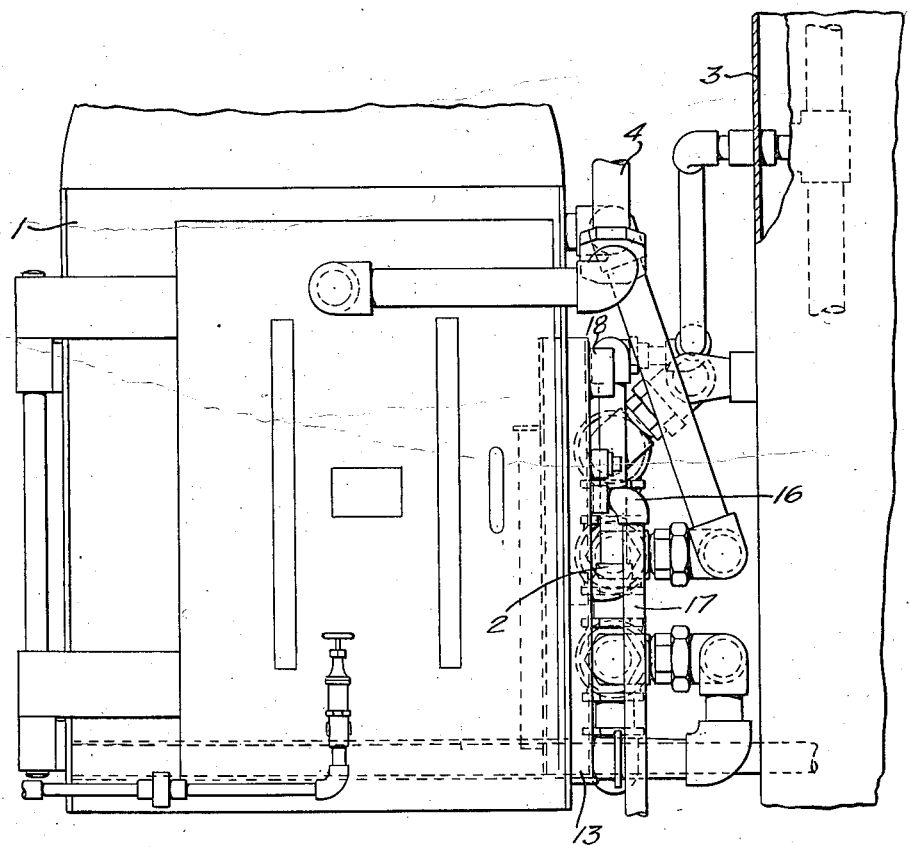
Figure 3:
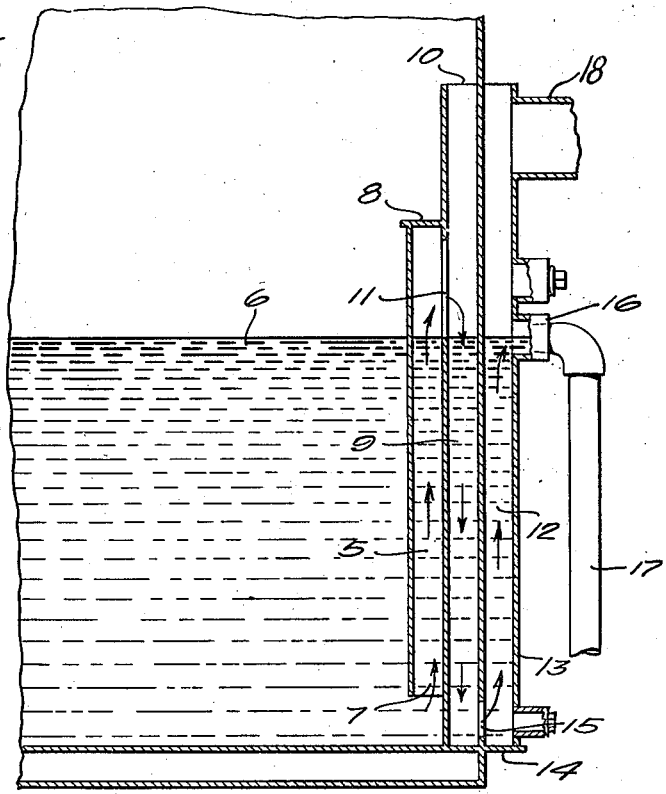

An evaporator arranged in accordance with the invention, and a series of evaporators arranged for a multiple effect evaporation plant are illustrated in the accompanying drawings and described in detail below. The drawings include:

Fig. 1. which is an end elevation of an evaporator embodying this invention;

Fig. 2 which is a fragmentary side elevation of the same arranged adjacent a boiler;

Fig. 3 which is a fragmentary section taken along the line 3—3 of Fig. 1; and

Figure 4:
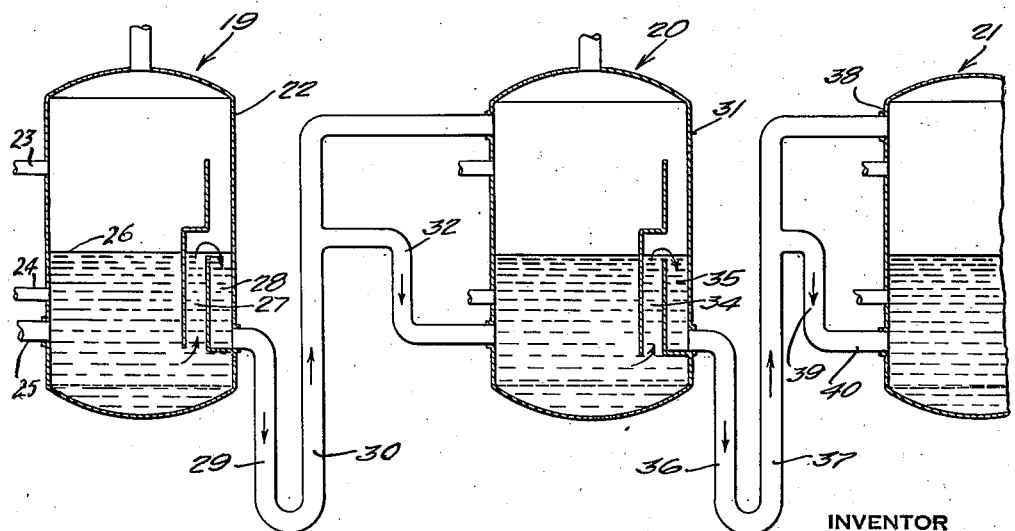

Fig. 4 which is a diagrammatic illustration of a multiple effect evaporation system embodying this invention.

The liquid evaporator illustrated in the drawings may be, with the exception of the improvement of this invention, of a kind that is well known and well understood in the art. In general, the evaporator includes a shell 1 which is adapted to contain the liquid to be evaporated. To the end of receiving the liquid to be evaporated, the shell is provided with an inlet opening below the water level thereof that is connected to an inlet pipe 2 through which liquid is fed to the evaporator shell. In the arrangement illustrated, which corresponds to the arrangement disclosed in the aforesaid application Serial No. 432,612 for Distillation system, the inlet pipe 2 connects between a direct fired first effect evaporator or boiler 3 and the shell 1 so that the blow down from the boiler 3 is delivered to the shell 1 as the liquid to be evaporated therein.

Within the shell 1, there is a coil (not shown) through which a fluid heating means is circulated. The heat from the heated fluid or vapor passing through the coil is transferred through the coil to the liquid within the shell to raise the liquid to the vaporization point. In the arrangement illustrated, the coil within the evaporator shell 1 is supplied with the steam or vapor formed in the direct fired boiler 3, which constitutes the heating medium within the evaporator 1. This vapor is delivered to the coil through pipes 4 and after passing through the coil may be, as described in the aforementioned copending application, delivered to a condenser to form part of the condensate, or as more common, returned to the boiler as feed water.

The liquid outlet from the evaporator shell 1 consists of a system of passages which are in open communication. On the interior of the shell two vertical passages are formed, preferably by welding formed shapes to the shell. One of these passages indicated by the numeral 5 extends from a point above the water level, indicated by the line 6 in Fig. 3, to a point adjacent the bottom of the shell. This passage is open at the bottom 7 close to the bottom of the shell and it is closed at the top by a cap plate 8. The other of these passages 9 extends from the bottom of the shell to a point well above the water level of the shell. This latter passage at its upper end is, at 10, open to the interior of the shell. At a point 11, at the water level 6, the passages 5 and 9 are in open communication. With this arrangement, the pressures in the two passages are equalized and the level of the liquid therein will rise and fall with the rise and fall of the water level within the shell 1.

On the outside of the shell a vertical passage 12 is formed by a semi-cylindrical plate 13 welded to the outside of the shell. This passage extends from a point well above the water level to the bottom of the shell and it is closed at the lower end. It is open at the top, when the liquid from the shell is discharged to waste at atmospheric pressure. A base plate 14 closes the passage at the bottom. Through an opening 15 in the wall of the shell, adjacent the bottom thereof, the passage 12 is in open communication with the passage 9. Intermediate the ends of the passage 12, a coupling 16 is provided in the plate 13 and serves to effect communication with an outlet pipe 17. The outlet opening from the passage 12 and the outlet coupling are at the water level. Substantially above the outlet coupling 16, a much larger overflow outlet 18 is provided. The upper ends of the passages 9 and 12 are substantially above the level of the overflow outlet.

Where the shell 1 constitutes the shell of an evaporator in a single effect evaporation system or the shell of the last evaporator in a multiple effect evaporation system, the outlet 16 discharges to waste, that is, at atmospheric pressure. The upper end of the passage 12 is therefore open to atmosphere. Wherever the outlet is connected or discharges to a chamber under pressure, the upper end of the passage 12 must be connected in like manner as the outlet, that is to say to a gaseous or pressure chamber of equal pressure as that to which the outlet is connected.

With this arrangement or system of passages, the water level in the passage 12 remains practically constant only rising enough to discharge the excess water in the evaporator shell when the water level in the evaporator shell exceeds the fixed level set by the height of weir forming partition between passages 5 and 9. The opening 11 is of sufficiently large proportions to avoid any restricted passage or in any way interfere with the bottom edge of this passage way 11 acting as a weir. The outlet 16 must never be above the water level 6 but may be below that level. The height from passage way 15 to outlet 16 does have a bearing on the degree of pressure which can be held within the shell 1. A shell pressure in excess of the static head fixed by the distance between the passage way 15 and passage way 16 would result in a complete blow out of the column of water normally existing between passage ways 15 and 16. If the water in the shell 1 goes below the level of the outlet 16 no water is discharged. Since the upper end of the passage 12 is connected to a gaseous medium of the same pressure as that of the outlet, no vacuum can be created in the overflow lines and syphoning action cannot take place. If the feed, a forced feed for example, should exceed the capacity of the outlet, the liquid in the shell may rise to the overflow 18 through which it is discharged and the flooding of the evaporator is avoided. On the other hand if, from some cause, the vapor pressure within the shell should rise above that desired, it can blow down through the system of passages to relieve the excess pressure.

Thus, the arrangement of passages in open communications serve to maintain the proper water level within the shell 1, prevents flooding of the shell and acts in the nature of a safety valve. In addition, the arrangement is eminently suitable for a continuous feed of liquid and a continuous blow down as the outlet automatically takes care of variations in the feed. As the communication with the system of passages is adjacent the bottom of the shell, the more concentrated liquid, i. e., that containing the greatest portion of solid matter is that which is withdrawn.

In Fig. 4, a series of evaporators arranged in a multiple effect evaporation system are illustrated diagrammatically. In such a system, particularly one arranged so that the blow down from each evaporator in the series passes continuously to and constitutes the liquid to be evaporated in the next succeeding evaporator in the series, the system of passages are modified in all but the last evaporator in the series. Three evaporators 19, 20 and 21, arranged on a common level, are illustrated in Fig. 4 arranged and interconnected in a series forming a multiple effect evaporation system suitable for continuous blow down.

The first evaporator 19 includes a shell 22 in which there is a heat transfer coil (not shown) having an inlet 23 and an outlet 24. The shell 22 is supplied with liquid to be evaporated through an inlet 25 located below the water level indicated by the line 26. Within the shell 22, there are passages 27 and 28 in all respects the same as the passages 5 and 9 in the shell 1. The passage 28, corresponding to the passage 9, is, however, connected, adjacent the level of the bottom of the shell to a passage in the shape of a U-tube extending below the level of the bottom of the evaporator 19 and in consequence below the level of the bottom of the evaporator 20.

One leg 29 of the U-tube passage is connected directly to the lower end of the passage 28. The other leg 30 of the U-tube passage extends to and is connected to the vapor chamber of the evaporator 20, that is, above the water level of the shell 31 of the evaporator 20. At the water level 26, which is the same for the several evaporators in the series, a passage 32 communicates with the leg 30 of the U-tube passage and extends to and communicates with the shell 31 of the evaporator 20 substantially below the water line, that is, to the liquid inlet 33 of the shell 31.

In like manner, the evaporator shell 31 of the evaporator 20 is provided with passages 34 and 35 in all respects comparable to the passages 5 and 9 of the shell 1. The passage 35, adjacent to the level of the bottom of the shell 31, is connected in like manner to one leg 36 of a U-tube passage, the other leg 37 of which is connected above and below the water level of the shell 38 of the evaporator 21. The leg 37 is connected to the shell 38 below the water level. This is effected by the passage 39 which is connected at one end to the leg 37 at a point adjacent the water level and at the other end to the inlet 40 of the shell 38. The other side of the shell 38 of the evaporator 21 is connected to waste at atmospheric pressure in the manner described above in connection with the shell 1.

It will be apparent that with this system a continuous supply and blow down, one to the other, of the evaporators is feasible. In addition, the several evaporators may operate at different pressures commensurate with the differential provided by the head of water in U-tubes. For example, the pressure in the evaporator 20 may be less than the pressure in the evaporator 19 by the amount of the head represented by the leg 30 of the U-tube passage between the evaporators 19 and 20. Such difference in operating pressure may exist without affecting the operation of the system as previously described.

It will be obvious that various changes may be made by those skilled in the art in the details of the evaporator, system of passages and arrangements of evaporators disclosed in the drawings and described in detail above within the principle and scope of the invention as defined in the appended claims.

I claim:

1. In a liquid evaporator, a shell for containing the liquid to be evaporated and a system of passages communicating with the interior and exterior of the shell, the system of passages being in open communication and comprising in combination a passage extending below and communicating with the shell below the liquid level thereof, another passage communicating with said first mentioned passage at substantially the liquid level and with the interior of the shell at a point to equalize the pressure in the passages, and a further passage communicating with said second mentioned passage adjacent the level of the bottom of the shell and having an outlet substantially at the water level of the shell and at a point above said outlet open in like manner as the outlet.

2. In a liquid evaporator, a shell for containing the liquid to be evaporated and a system of passages communicating with the interior and exterior of the shell, the system of passages being in open communication and comprising in combination a passage extending below and communicating with the shell below the liquid level thereof, and closed to the shell at the upper end thereof, another passage communicating with said first mentioned passage at substantially the liquid level and with the interior of the shell at a point to equalize the pressure in the passage, and a further passage communicating with said second mentioned passage adjacent the level of the bottom of the shell and having an outlet substantially at the water level of the shell and at a point above said outlet open in like manner as the outlet.

3. In a liquid evaporator, a shell for containing the liquid to be evaporated and a system of passages communicating with the interior and exterior of the shell, the system of passages being in open communication and comprising in combination, a passage within the shell extending adjacent to and communicating with the shell adjacent to the bottom thereof and closed to the shell above the water level thereof, another passage within the shell communicating with said first mentioned passage at substantially the water level and with the interior of the shell above the water level, and a further passage exteriorly of the shell communicating with said second mentioned passage adjacent the level of the bottom of the shell, said last mentioned passage having an outlet substantially at the water level of the shell and open at a point above said outlet in like manner as the outlet.

4. In a liquid evaporator, a shell for containing the liquid to be evaporated and a system of passages communicating with the interior and exterior of the shell, the system of passages being in open communication and comprising in combination, a passage within the shell extending adjacent to and communicating with the shell adjacent to the bottom thereof, another passage within the shell communicating with said first mentioned passage at substantially the water level and with the interior of the shell above the water level, and a further passage exteriorly of the shell communicating with said second mentioned passage adjacent the level of the bottom of the shell, said last mentioned passage having an outlet substantially at the water level of the shell and open at a point above said outlet to the atmosphere.

5. In a liquid evaporator, a shell for containing the liquid to be evaporated and a system of passages communicating with the interior and exterior of the shell, the system of passages being in open communication and comprising in combination, a passage within the shell extending adjacent to and communicating with the shell adjacent to the bottom thereof and closed to the shell above the water level thereof, another passage within the shell communicating with said first mentioned passage at substantially the water level and with the interior of the shell above the water level, and a further passage exteriorly of the shell communicating with said second mentioned passage adjacent the level of the bottom of the shell, said last mentioned passage having an outlet substantially at the water level of the shell, an overflow outlet above the water level of the shell and open at a point above the overflow to the atmosphere.

6. A series of liquid evaporators, each including a shell for containing liquid to be evaporated and one shell having a system of passages communicating with the interior thereof and the interior of the next succeeding evaporator shell, the system of passages being in open communication and comprising in combination a passage extending below and communicating with the first mentioned shell below the liquid level thereof, another passage communicating with said first mentioned passage at substantially the liquid level and with the interior of the shell at a point to equalize the pressure in the passages, and a further passage communicating with said second mentioned passage adjacent the level of the bottom of the shell and with the next succeeding evaporator shell in the series both below and above the water level thereof.

7. A series of liquid evaporators, each including a shell for containing liquid to be evaporated and one shell having a system of passages communicating with the interior thereof and the interior of the next succeeding evaporator shell, the system of passages being in open communication and comprising in combination a passage extending below and communicating with the first mentioned shell below the liquid level thereof, another passage communicating with said first mentioned passage at substantially the liquid level and with the interior of the shell at a point to equalize the pressure in the passages, and a further passage communicating with said second mentioned passage adjacent the level of the bottom of the shell, said last mentioned passage being in the shape of a U-tube extending below the bottom of the shell and the bottom of the next succeeding evaporator shell and communicating with the said next succeeding evaporator shell both above and below the water level thereof.

8. A series of liquid evaporators, each including a shell for containing liquid to be evaporated and one shell having a system of passages communicating with the interior thereof and the interior of the next succeeding evaporator shell, the system of passages being in open communication and comprising in combination a passage extending below and communicating with the first mentioned shell below the liquid level thereof, another passage communicating with said first mentioned passage at substantially the liquid level and with the interior of the shell at a point to equalize the pressure in the passages, and a further passage communicating with said second mentioned passage adjacent the level of the bottom of the shell, said last mentioned passage being in the shape of a U-tube extending below the bottom of the shell and the bottom of the next succeeding evaporator shell and communicating with the said next succeeding evaporator shell above the water level thereof, and a passage communicating with the U-tube passage at the water level and with said next succeeding evaporator shell below the water level thereof.

WILLIAM H. THOMPSON.